(12) United States Patent
Zheng et al.

(10) Patent No.: US 11,403,225 B2
(45) Date of Patent: Aug. 2, 2022

(54) PREFETCHER, OPERATING METHOD OF PREFETCHER, AND PROCESSOR OPERATED BASED ON UPDATED OFFSET AMOUNT

(71) Applicant: Shanghai Zhaoxin Semiconductor Co., Ltd., Shanghai (CN)

(72) Inventors: Xianpei Zheng, Shanghai (CN); Zhongmin Chen, Shanghai (CN); Qi Li, Shanghai (CN)

(73) Assignee: Shanghai Zhaoxin Semiconductor Co., Ltd., Shanghai (CN)

( * ) Notice: Subject to any disclaimer, the term of this patent is extended or adjusted under 35 U.S.C. 154(b) by 165 days.

(21) Appl. No.: 16/658,129

(22) Filed: Oct. 20, 2019

(65) Prior Publication Data

US 2021/0096995 A1  Apr. 1, 2021

(30) Foreign Application Priority Data

Sep. 30, 2019  (CN) .......................... 201910940253.X (51) Int. Cl.
*G06F 12/0862* (2016.01)
(52) U.S. Cl.
CPC .. *G06F 12/0862* (2013.01); *G06F 2212/1021* (2013.01); *G06F 2212/6022* (2013.01); *G06F 2212/6024* (2013.01)
(58) Field of Classification Search
CPC ......... G06F 12/0862; G06F 2212/1021; G06F 2212/6022; G06F 2212/6024;
(Continued)

(56) References Cited

U.S. PATENT DOCUMENTS 6,446,167 B1 * 9/2002 Mayfield ............... G06F 9/3802
711/118
6,571,318 B1 * 5/2003 Sander ................ G06F 12/0862
711/137
(Continued)

FOREIGN PATENT DOCUMENTS

CN  101165662  4/2008
CN  103513957  1/2014
(Continued)

OTHER PUBLICATIONS

"According to" definition, dictionary.com, random house, inc. 2021. https://www.dictionary.com/browse/according-to (Year: 2021).*
(Continued)

*Primary Examiner* — Michael Krofcheck
(74) *Attorney, Agent, or Firm* — JCIPRNET (57) ABSTRACT

A prefetcher, an operating method of the prefetcher, and a processor including the prefetcher are provided. The prefetcher includes a prefetch address generating circuit, an address tracking circuit, and an offset control circuit. The prefetch address generating circuit generates a prefetch address based on first prefetch information and an offset amount. The address tracking circuit stores the prefetch address and a plurality of historical prefetch addresses. When receiving an access address, the offset control circuit updates the offset amount based on second prefetch information, the access address, the prefetch address, and the historical prefetch addresses, and provides the prefetch address generating circuit with the updated offset amount.

30 Claims, 5 Drawing Sheets

(58) Field of Classification Search
CPC ....... G06F 2212/602; G06F 2212/6028; G06F 2212/6026
See application file for complete search history.

(56) References Cited

U.S. PATENT DOCUMENTS

| | | | |
|---|---|---|---|
| 8,285,941 | B2 | 10/2012 | Ekanadham et al. |
| 2013/0318306 | A1* | 11/2013 | Gonion ............... G06F 9/30043 711/137 |
| 2014/0173254 | A1 | 6/2014 | Ruehle |
| 2015/0143057 | A1* | 5/2015 | Pavlou .................... G06F 12/02 711/137 |
| 2017/0091104 | A1* | 3/2017 | Rafacz ................ G06F 12/0862 |
| 2018/0089087 | A1* | 3/2018 | Chang ................. G06F 12/0862 |
| 2019/0272234 | A1* | 9/2019 | Bondarenko ....... G06F 12/0862 |

FOREIGN PATENT DOCUMENTS

| | | |
|---|---|---|
| CN | 104133780 | 11/2014 |
| CN | 105930281 | 9/2016 |
| CN | 109783399 | 5/2019 |

OTHER PUBLICATIONS

Hadimioglu et al., "High Performance Memory Systems," 2004, Springer Science+Business Media, LLC, pp. 213-225 (Year: 2004).*
Seth H Pugsley et al., "Sandbox Prefetching: Safe Run-Time Evaluation of Aggressive Prefetchers," 2014 IEEE 20th International Symposium on High Performance Computer Architecture (HPCA), Jun. 19, 2014, pp. 1-12.

* cited by examiner

PREFETCHER, OPERATING METHOD OF PREFETCHER, AND PROCESSOR OPERATED BASED ON UPDATED OFFSET AMOUNT

CROSS-REFERENCE TO RELATED APPLICATION

This application claims the priority benefit of China application serial no. 201910940253.X, filed on Sep. 30, 2019. The entirety of the above-mentioned patent application is hereby incorporated by reference herein and made a part of this specification.

BACKGROUND

Technical Field

The disclosure relates to a prefetcher, an operating method of the prefetcher and a processor, and particularly relates to a prefetcher with better timeliness, accuracy and coverage, an operating method of the prefetcher and a processor.

Description of Related Art

The concept of data prefetching in a microprocessor is well known. In order to avoid a rather long latency for accessing a system memory when a cache memory has a cache miss, the microprocessor monitors the latest access address required by memories, attempts to predict data needed in the future, and prefetches the predicted data to a cache memory of the microprocessor.

However, in the existing technique, due to the lack of a run-time evaluation mechanism in the manner of data prefetching, it is impossible to know the accuracy of the prefetching. In this case, the mechanism of prefetching tends to be conservative, so that only the adjacent cache lines are prefetched, resulting in a defect of excessively small coverage. Moreover, if only the adjacent cache lines are prefetched, it may also affect the timeliness of the overall prefetching mechanism.

Therefore, it is an important issue for those skilled in the art to design a data prefetching mechanism that is more active and has better coverage and timeliness.

SUMMARY

The disclosure is directed to a prefetcher, an operating method of the prefetcher, and a processor including the prefetcher, which are adapted to provide a data prefetching operation having better timeliness, accuracy and coverage.

The disclosure provides a prefetcher including a prefetch address generating circuit, an address tracking circuit, and an offset control circuit. The prefetch address generating circuit generates a prefetch address based on first prefetch information and an offset amount. The address tracking circuit is coupled to the prefetch address generating circuit, and stores the prefetch address and a plurality of historical prefetch addresses. The offset control circuit is coupled to the prefetch address generating circuit and the address tracking circuit, wherein when the offset control circuit receives an access address, the offset control circuit updates the offset amount according to second prefetch information, the access address, the prefetch address and the historical prefetch addresses, and provides the updated offset amount to the prefetch address generating circuit.

The disclosure provides a processor including a load/storage unit, an access filter, an evaluation circuit and at least one cache unit. The load/storage unit provides a plurality of access addresses. The access filter is coupled to the load/storage unit, and filters repeated addresses of the access addresses. The evaluation circuit scores a plurality of stride candidates based on each of the filtered access addresses, selects a stride from the stride candidates, and determines a first base address and a prefetch amount according to a score of the stride. The at least one cache unit is coupled to the evaluation circuit, wherein each cache unit comprises a prefetcher, and the prefetcher of each cache unit includes a prefetch address generating circuit, an address tracking circuit, and an offset control circuit. The prefetch address generating circuit is coupled to the evaluation circuit, and generates a prefetch address based on first prefetch information and an offset amount. The address tracking circuit is coupled to the evaluation circuit and the prefetch address generating circuit, and stores the prefetch address and a plurality of historical prefetch addresses. The offset control circuit is coupled to the prefetch address generating circuit and the address tracking circuit, wherein when the offset control circuit receives an access address, the offset control circuit updates the offset amount according to second prefetch information, the access address, the prefetch address and the historical prefetch addresses, and provides the updated offset amount to the prefetch address generating circuit, wherein the second prefetch information includes the stride, the first base address and the prefetch amount.

The disclosure provides an operating method of a prefetcher including: generating a prefetch address by a prefetch address generating circuit of the prefetcher based on first prefetch information and an offset amount; storing the prefetch address and a plurality of historical prefetch addresses by an address tracking circuit of the prefetcher; when an offset control circuit of the prefetcher receives an access address, updating the offset amount by the offset control circuit according to second prefetch information, the access address, the prefetch address and the historical prefetch addresses, and providing the updated offset amount to the prefetch address generating circuit, wherein the second prefetch information at least includes a stride and a prefetch amount; and generating (PN−1) additional prefetch addresses according to the prefetch address and the stride, and prefetching a plurality of data according to the prefetch address and the (PN−1) additional prefetch addresses, wherein PN is the prefetch amount.

Based on the above description, the processor, the prefetcher and the operating method of the prefetch of the disclosure may use the evaluation circuit to find out the most suitable stride for data prefetching based on the access addresses provided by the load/storage unit, so as to generate the first base address and the prefetch amount. Thereafter, the evaluation circuit provides the stride, the first base address and the prefetch amount to the prefetchers of each level of the cache units, so as to improve the accuracy, timeliness and coverage of the data prefetching operation of each of the prefetchers.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
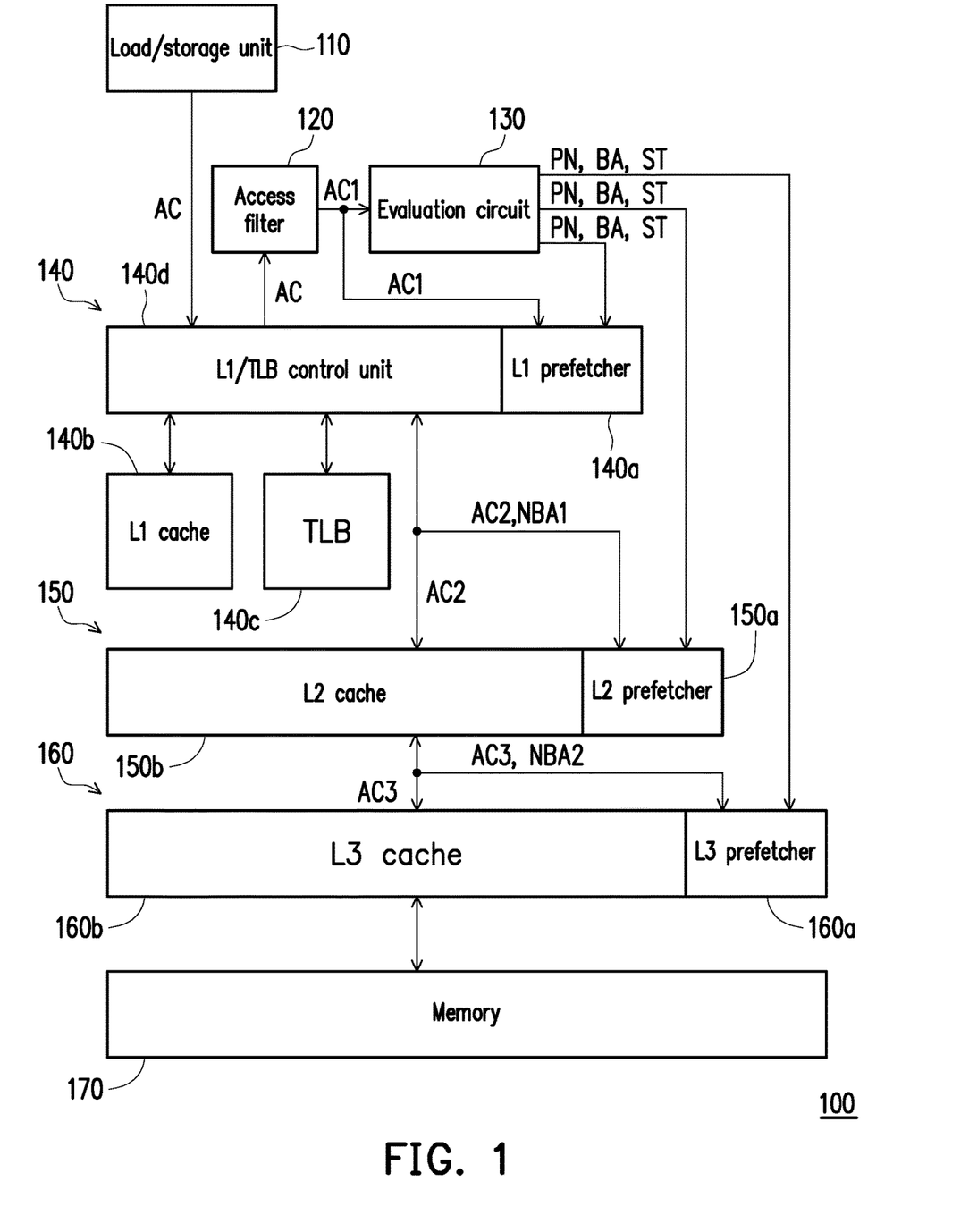
FIG. 1 is a schematic diagram of a processor according to an embodiment of the disclosure.

Referring to FIG. 1, FIG. 1 is a schematic diagram of a processor according to an embodiment of the disclosure. In the embodiment, the processor 100 includes a load/storage unit 110, an access filter 120, an evaluation circuit 130, a level-1 (L1) cache unit 140, a level-2 (L2) cache unit 150, a level-3 (L3) cache unit 160 and a memory 170.

As shown in FIG. 1, the L1 cache unit 140 includes an L1 prefetcher 140a, an L1 cache 140b, a translation lookaside buffer (TLB) 140c and an L1/TLB control unit 140d. The L2 cache unit 150 includes an L2 prefetcher 150a and an L2 cache 150b. The L3 cache unit 160 includes an L3 prefetcher 160a and an L3 cache 160b.

In the L1 cache unit 140, the L1/TLB control unit 140d is coupled to the load/storage unit 110 to receive an access address AC from the load/storage unit 110, and may interact with the L1 cache 140b or the TLB 140c.

The access filter 120 is coupled to the L1/TLB control unit 140d, and receives the access address AC from the L1/TLB control unit 140d. In the embodiment, the access filter 120 filters the repeated access address AC to generate an access address AC1 different with others, and provides the access address AC1 to the evaluation circuit 130 and the L1 prefetcher 140a. In an embodiment, the access filter 120 is, for example, a bloom filter of 2048 bits, and the access filter 120 is configured to be reset after generating every X (for example 256) access addresses AC1, but the disclosure is not limited thereto.

After the evaluation circuit 130 receives the access address AC1, the evaluation circuit 130 may score a plurality of stride candidates based on the access address AC1, and selects a stride ST with the highest score from the stride candidates, and determines a base address BA and a prefetch amount PN according to the score of the stride ST. In an embodiment, the above stride candidates, for example, may be 2N integer values from −N to N (excluding 0), N is a positive integer value, wherein each stride candidate corresponds to a score. In an embodiment, the scores each stride candidate corresponding to are the same. In an other embodiment, when the absolute value of the stride candidate is closer to 0, the stride candidate corresponds to a higher score, when the absolute value of the stride candidate is closer to N, the stride candidate corresponds to a lower score. The disclosure is not limited thereto, those skilled in the art are instructed that the configuration of the score corresponding to a stride candidate depends on realistic requirements.

To be specific, when the evaluation circuit 130 receives the $1^{st}$ access address AC1, i.e., access address AC1_1, the evaluation circuit 130 may generate a plurality of first prefetch address candidates according to the aforementioned stride candidates and the $1^{st}$ access address AC1_1, wherein the first prefetch address candidates correspond to the above stride candidates one-to-one. In other words, when the evaluation circuit 130 receives the $1^{st}$ access address AC1_1, the evaluation circuit 130 may accordingly generate 2N prefetch address candidates by respectively adding the $1^{st}$ access address AC1_1 and the 2N stride candidates, wherein the 2N stride candidates are respectively equal to the integer from −N to N (excluding 0), thus the 2N first prefetch address candidates may correspond to the 2N stride candidates from −N to N one-to-one. In an embodiment, the $i^{th}$ of the above first prefetch address candidates may be represented as the $1^{st}$ access address AC1_1 plus the $i^{th}$ stride candidate of the aforementioned stride candidates, wherein i is a positive integer between 1 and 2N.

It should be noted that after the evaluation circuit 130 generates the aforementioned first prefetch address candidates, the processor 100 does not actually perform data prefetching operations based on these candidate prefetch addresses, but only takes the first prefetch address candidates as a basis for evaluating the stride candidates.

Then, when the evaluation circuit 130 receives the access address AC1, i.e., the $2^{nd}$ access address AC1_2, the evaluation circuit 130 may determine whether the $2^{nd}$ access address AC1_2 matches one of the aforementioned first prefetch address candidates, i.e., whether the $2^{nd}$ access address AC1_2 hits the aforementioned first prefetch address candidates. If the $2^{nd}$ access address AC1_2 matches the $a^{th}$ of the aforementioned first prefetch address candidates, the evaluation circuit 130 may accumulate the score corresponding to the $a^{th}$ of the aforementioned stride candidates to the total score of the $a^{th}$ of the aforementioned stride candidates, wherein a is a positive integer between 1 and 2N. Moreover, the evaluation circuit 130 may again generate a plurality of second prefetch address candidates corresponding to the 2N stride candidates from −N to N based on the aforementioned 2N stride candidates and the $2^{nd}$ access address AC1_2, and in these second prefetch address candidates, the $j^{th}$ second prefetch address candidate may be represented as the $2^{nd}$ access address AC1_2 plus the $j^{th}$ stride candidate of the aforementioned 2N stride candidates, wherein j is a positive integer between 1 and 2N.

The above operation may be again executed each time when a new access address AC1 is received. Namely, when the evaluation circuit 130 receives a $p^{th}$ access address AC1, i.e., access address AC1_p, the evaluation circuit 130 may determine whether the $p^{th}$ access address AC1 hits the plurality of prefetch address candidates ($(p-1)^{th}$ prefetch address candidates) generated based on a $(p-1)^{th}$ access address AC1_p−1, and if yes, the evaluation circuit 130 accumulates the score of the corresponding candidate stride to the total score of the corresponding stride candidate, wherein p is a positive integer between 1 and X. Moreover, the evaluation circuit 130 may again generate a plurality of $p^{th}$ prefetch address candidates corresponding to the 2N stride candidates from −N to N based on the aforementioned stride candidates and the $p^{th}$ access address AC1_p, and in these prefetch address candidates, the $k^{th}$ of the $p^{th}$ prefetch address candidates may be represented as the $p^{th}$ access address AC1_p plus the $k^{th}$ stride candidate of the aforementioned stride candidates, wherein k is a positive integer between 1 and 2N.

Moreover, in an embodiment, the evaluation circuit 130 may further determine whether the $(p-1)^{th}$ access address AC1_p−1, a $(p-2)^{th}$ access address AC1_p−2 and a $(p-3)^{th}$ access address AC1_p−3 hit the plurality of prefetch address candidates generated based on the $(p-1)^{th}$ access address AC1_p−1, and if yes, the evaluation circuit 130 accumulates the score of the corresponding stride candidate to the total score of the corresponding stride candidate. In other words, besides determining whether the currently received $p^{th}$ access address AC1_$p$ hits, the evaluation circuit 130 may further consider whether several access addresses AC1, such as access address AC1_$p$-1, access address AC1_$p$-2 and access address AC1_$p$-3 before the $p^{th}$ access address AC1_$p$ hit, and correspondingly adjust the total scores of the corresponding stride candidates, but the disclosure is not limited thereto.

Thereafter, when the evaluation circuit 130 receives a (p+1) access address AC1_$p$+1, the evaluation circuit 130 may determine whether the $(p+1)^{th}$ access address AC1_$p$+1 hits the plurality of $p^{th}$ prefetch address candidates generated based on the $p^{th}$ access address AC1_$p$, and if the $(p+1)^{th}$ access address AC1_$p$+1 matches a $q^{th}$ prefetch address candidate of the aforementioned $p^{th}$ prefetch address candidates, the evaluation circuit 130 accumulates the score of the $q^{th}$ of the aforementioned stride candidates to the total score of the $q^{th}$ of the aforementioned stride candidates, wherein q is a positive integer between 1 and 2N.

After evaluating the total scores of the aforementioned 2N stride candidates based on the aforementioned X access addresses AC1, the evaluation circuit 130 may select the stride ST from the 2N stride candidates, wherein the stride ST may be one of the 2N stride candidates with the highest total score.

Then, the evaluation circuit 130 may take a specific prefetch address candidate corresponding to the stride ST as the base address BA. In an embodiment, the specific prefetch address candidate is, for example, a prefetch address candidate corresponding to the stride ST in the plurality of $X^{th}$ prefetch address candidates generated based on the $X^{th}$ (i.e., $256^{th}$) access address AC1_X. For example, it is assumed that the stride ST is a $b^{th}$ of the aforementioned 2N stride candidates, the specific prefetch address candidate is the $b^{th}$ of the plurality of $X^{th}$ prefetch address candidates, wherein b is a positive integer between 1 and 2N. In this case, the evaluation circuit 130 may adopt the $b^{th}$ of the plurality of $X^{th}$ prefetch address candidates as the base address BA.

In brief, the evaluation circuit 130 scores a second amount (2N) stride candidates based on a first amount (X) access addresses AC1 coming from the access filter 120. When a certain specific stride candidate has the highest total score, it represents that a hit rate of the specific stride candidate is the highest, so that it is suitable to serve as the stride ST in the subsequent actual prefetching operation.

Moreover, in an embodiment, a designer may further define a plurality of sections, and let the evaluation circuit 130 to determine the prefetch amount PN according to the section including the total score of the stride ST, i.e., an amount of cache lines that may be prefetched once by the L1 prefetcher 140a or the L2 prefetcher 150a or the L3 prefetcher 160a later based on the stride ST.

For example, when the total score of the stride ST is in a first section (for example, greater than 768), the evaluation circuit 130 may set the prefetch amount PN as a first amount (for example, 3). When the total score of the stride ST is in a second section (for example, between 768 and 512), the evaluation circuit 130 may set the prefetch amount PN as a second amount (for example, 2). When the total score of the stride ST is in a third section (for example, between 512 and 256), the evaluation circuit 130 may set the prefetch amount PN as a third amount (for example, 1).

Generally, the higher the total score of the stride ST is, the higher the corresponding hit rate is, and the higher prefetch amount PN is adopted. Conversely, the lower the score of the stride ST is, the lower the corresponding hit rate is, and the lower prefetch amount PN is adopted.

According to another aspect, the evaluation circuit 130 may be regarded as taking multiple access addresses AC1 as a training pattern, to simulate the situation of performing prefetching operation according to each stride candidate, and then take the stride candidate achieving the highest hit rate in the simulation process as the stride ST in actual prefetching operation. Since the evaluation circuit 130 takes multiple access addresses AC1 as training samples, and the multiple access addresses AC1 may be essentially are provided by the load/storage unit 110, the process of evaluating the aforementioned stride candidates may be similar to a behavior of a program running by the processor 100, so as to find the stride ST which may improve the accuracy of prefetching operation.

According to FIG. 1, it is learned that the evaluation circuit 130 may provide the prefetch amount PN, the base address BA and the stride ST to the L1 prefetcher 140a, the L2 prefetcher 150a and the L3 prefetcher 150a to perform the prefetching operation, and details thereof are described later.

In FIG. 1, when an access address AC1 has a cache miss in the L1 cache unit 140, the missed access address AC1 may be taken as an access address AC2 provided to the L2 cache unit 150. Moreover, since the L2 cache unit 150 is operated based on discontinuous physical addresses, the L1 cache unit 140 may additionally provide a next page base address NBA1 to the L2 prefetcher 150a of the L2 cache unit 150. In this way, when the L2 prefetcher 150a of the L2 cache unit 150 determines that a cross-page situation probably occurs, the L2 prefetcher 150a may perform the prefetching operation based on the next page base address NBA1 accordingly.

Similarly, when the access address AC2 has a cache miss in the L2 cache unit 150, the missed access address AC2 may be taken as an access address AC3 provided to the L3 cache unit 160. Moreover, since the L3 cache unit 160 is operated based on discontinuous physical addresses, the L2 cache unit 150 may additionally provide a next page base address NBA2 to the L3 prefetcher 160a of the L3 cache unit 160. In this way, when the L3 prefetcher 160a of the L3 cache unit 160 determines that the cross-page situation probably occurs, the L3 prefetcher 160a may perform the prefetching operation based on the next page base address NBA2.

In an embodiment, the next page base address NBA1 or NBA2 is the first address of the second page of two adjacent pages. In an embodiment, when the cross-page situation occurs, take the next page base address NBA1 or NBA2 as a new base address BA.

For simplicity's sake, the prefetch amount PN, the base address BA, and the stride ST provided to the L1 prefetcher 140a are hereinafter referred to as prefetch information provided to the L1 prefetcher 140a; the next page base address NBA1, the prefetch amount PN, the base address BA, and the stride ST provided to the L2 prefetcher 150a are hereinafter referred to as prefetch information provided to the L2 prefetcher 150a; the next page base address NBA2, the prefetch amount PN, the base address BA, and the stride ST provided to the L3 prefetcher 160a are hereinafter referred to as prefetch information provided to the L3 prefetcher 160a.

Generally, the L1 prefetcher 140a, the L2 prefetcher 150a and the L3 prefetcher 160a in FIG. 1 are substantially the same in structure, and perform the corresponding prefetching operation according to the corresponding prefetch information and the received access address AC1, AC2 or AC3, which is further described below with reference of FIG. 2.

Figure 2:
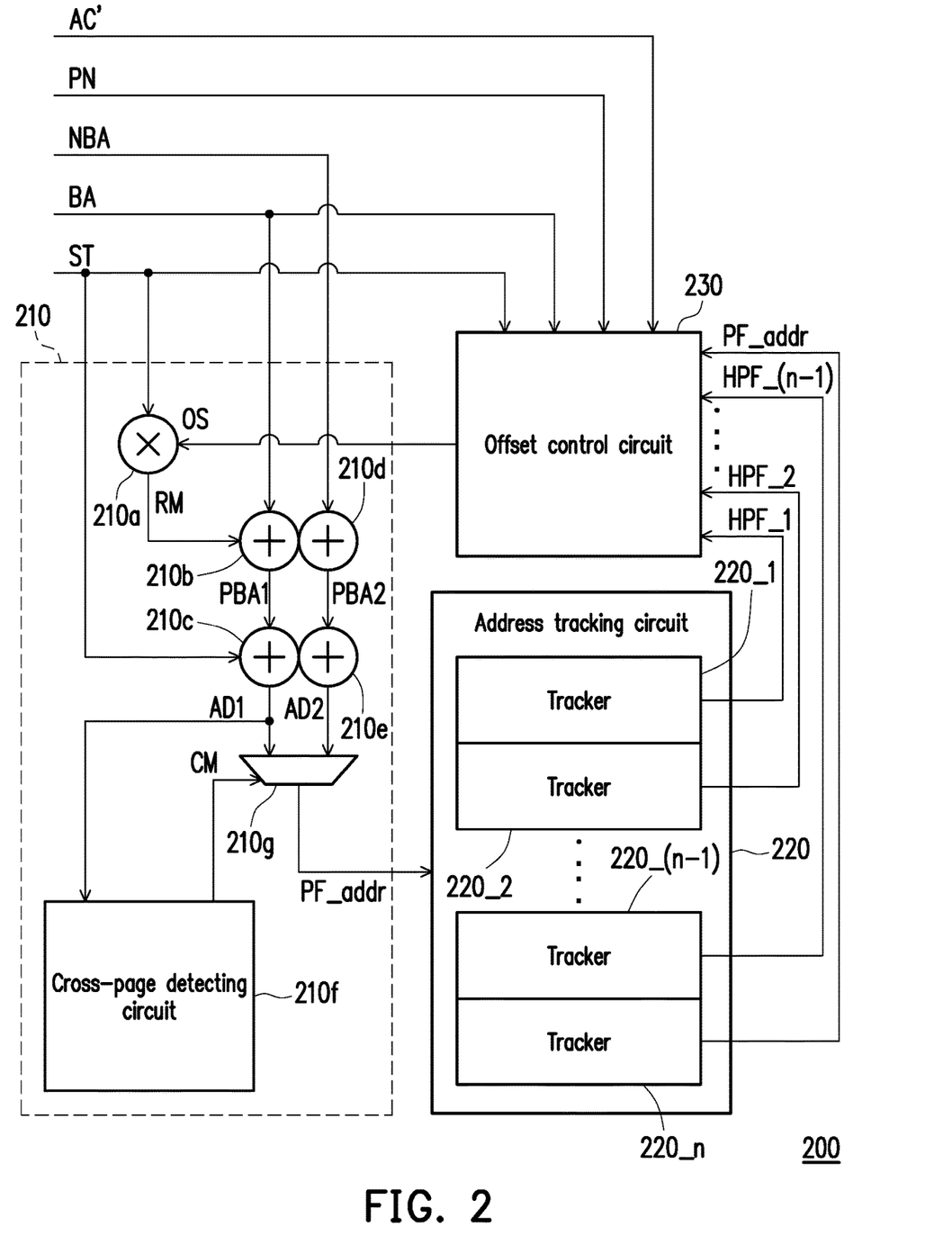
FIG. 2 is a schematic diagram of a prefetcher illustrated according to FIG. 1.

Referring to FIG. 2, FIG. 2 is a schematic diagram of a prefetcher illustrated according to FIG. 1. In the embodiment, the prefetcher 200 may be one of the L1 prefetcher 140a, the L2 prefetcher 150a and the L3 prefetcher 160a, and may receive the prefetch amount PN, the base address BA and the stride ST from the evaluation circuit 130. However, the access address AC' and the next page base address NBA received by the prefetcher 200 may be different based on the prefetcher 200 is used as the L1 prefetcher 140a or the L2 prefetcher 150a or the L3 prefetcher 160a.

If the prefetcher 200 is used for implementing the L1 prefetcher 140a of FIG. 1, the access address AC' may be the access address AC1 of FIG. 1. Moreover, since the L1 cache unit 140 of FIG. 1 is operated based on continuous virtual addresses without encountering the cross-page situation, it is possible not to set a line for receiving the next page base address NBA and an operation circuit related to the next page base address NBA, but the disclosure is not limited thereto.

If the prefetcher 200 is used for implementing the L2 prefetcher 150a of FIG. 1, the access address AC' may be the access address AC2 of FIG. 1, and the next page base address NBA may be the next page base address NBA1 coming from the L1 cache unit 140. Moreover, if the prefetcher 200 is used for implementing the L3 prefetcher 160a of FIG. 1, the access address AC' may be the access address AC3 of FIG. 1, and the next page base address NBA may be the next page base address NBA2 coming from the L2 cache unit 150.

As shown in FIG. 2, the prefetcher 200 includes a prefetch address generating circuit 210, an address tracking circuit 220 and an offset control circuit 230. The prefetch address generating circuit 210 generates a prefetch address PF_addr based on first prefetch information, the first prefetch information comprises the stride ST, the base address BA, the next page base address NBA (if any) and an offset amount OS.

In the embodiment, the prefetch address generating circuit 210 includes a multiplying unit 210a, a first adder 210b, a second adder 210c, a third adder 210d, a fourth adder 210e, a cross-page detecting circuit 210f and a multiplexer 210g. The multiplying unit 210a receives the stride ST and the offset amount OS, and multiplies the stride ST and the offset amount OS to generate a reference product RM. The first adder 210b is coupled to the multiplying unit 210a, receives the reference product RM and the base address BA, and adds the reference product RM and the base address BA to generate a first prefetch base address PBA1. The second adder 210c is coupled to the first adder 210b, receives the stride ST and the first prefetch base address PBA1, and adds the stride ST and the first prefetch base address PBA1 to generate a first prefetch address AD1.

The third adder 210d is coupled to the multiplying unit 210a, receives the next page base address NBA and the stride ST, and adds the next page base address NBA and the stride ST to generate a second prefetch base address PBA2. The fourth adder 210e is coupled to the third adder 210d, receives the stride ST and the second prefetch base address PBA2, and adds the stride ST and the second prefetch base address PBA2 to generate a second prefetch address AD2. The cross-page detecting circuit 210f is coupled to the second adder 210c, receives the first prefetch address AD1, determines whether the first prefetch address AD1 encounters the cross-page situation, and correspondingly generates a control signal CM. The multiplexer 210g is coupled to the second adder 210c and the fourth adder 210e, and receives the first prefetch address AD1 and the second prefetch address AD2, the multiplexer 210g takes the first prefetch address AD1 or the second prefetch address AD2 as the prefetch address PF_addr to output to the address tracking circuit 220 according to the control signal CM.

In an embodiment, when the control signal CM indicates that the first prefetch address AD1 does not encounter the cross-page situation, the multiplexer 210g may take the first prefetch address AD1 as the prefetch address PF_addr to output to the address tracking circuit 220. However, when the control signal CM indicates that the first prefetch address AD1 encounters the cross-page situation, the multiplexer 210g may take the second prefetch address AD2 as the prefetch address PF_addr to output to the address tracking circuit 220.

The address tracking circuit 220 is coupled to the prefetch address generating circuit 210, and stores the prefetch address PF_addr and a plurality of historical prefetch addresses HPF_1, HPF_2, . . . , and HPF_(n−1). In the embodiment, the address tracking circuit 220 may include n trackers 220_1, 220_2, . . . , 220_(n−1), 220_n, to record the prefetch address PF_addr and the aforementioned (n−1) historical prefetch addresses HPF_1-HPF_(n−1), wherein n is a positive integer. Moreover, the trackers 220_1-220_n of the address tracking circuit 220 may construct a queue structure, and. After receiving the prefetch address PF_addr, the address tracking circuit 220 may push the prefetch address PF_addr into the queue structure, for example, store the prefetch address PF_addr on the tracker 220_n, and moves older historical prefetch addresses that have been stored in the queue structure towards the tracker 220_1. Moreover, when the queue structure is fully filled, the address tracking circuit 220 may remove the oldest historical prefetch address from the queue structure.

The offset control circuit 230 is coupled to the prefetch address generating circuit 210 and the address tracking circuit 220, when the offset control circuit 230 receives a new access address AC', the offset control circuit 230 updates the offset amount OS based on second prefetch information, the new access address AC', the prefetch address PF_addr and the historical prefetch addresses HPF_1-HPF_(n−1), and provides the updated offset amount OS to the prefetch address generating circuit 210, wherein the second prefetch information comprises the prefetch amount PN, the base address BA and the stride ST. Thereafter, the prefetch address generating circuit 210 may again perform the previously instructed operations based on the updated offset amount OS to generate a new prefetch address PF_addr.

In an embodiment, the offset control circuit 230 may update the offset amount OS based on a certain mechanism, and details thereof are described later with reference of FIG. 3.

Figure 3:
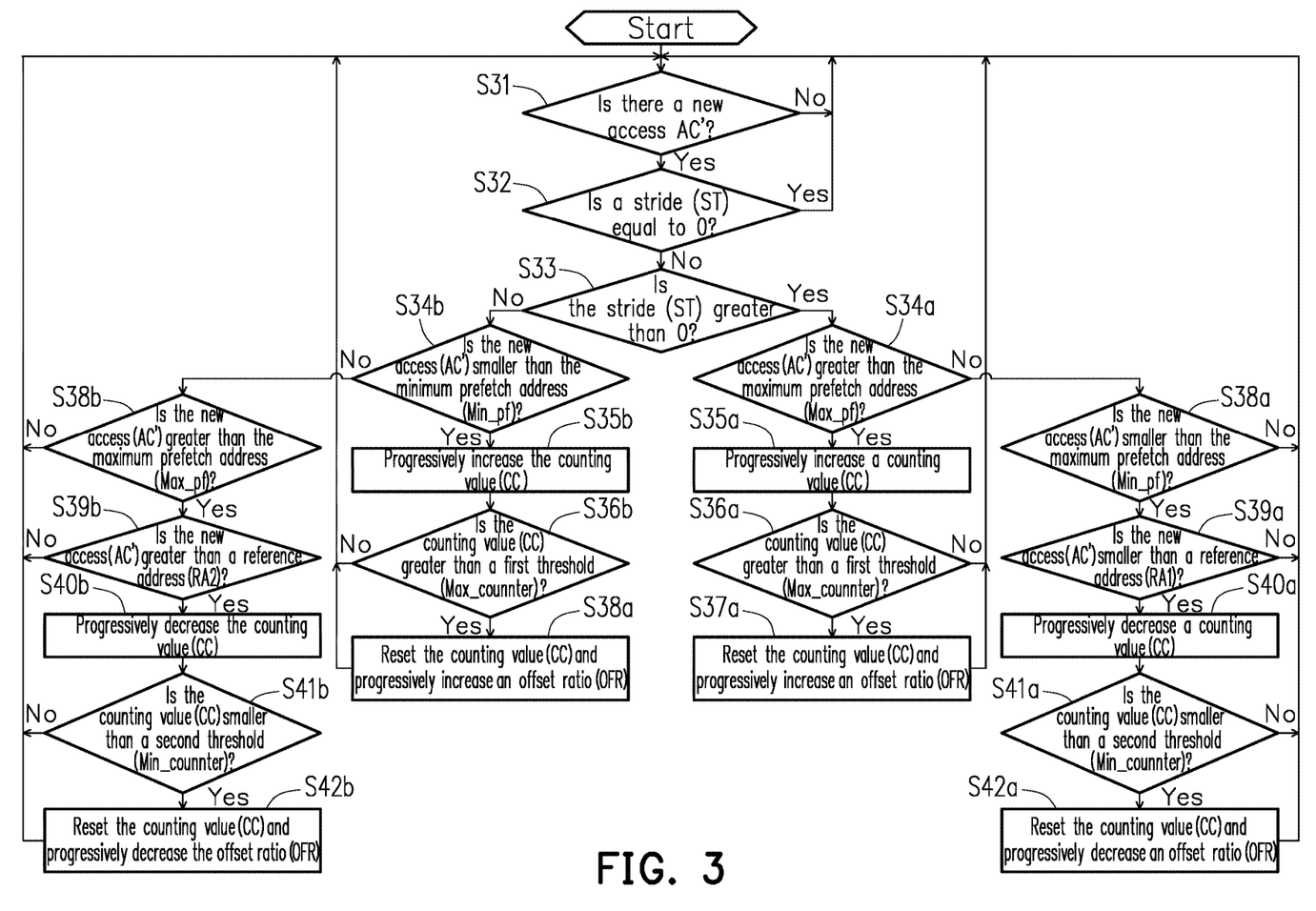
FIG. 3 is a flowchart illustrating a method for updating an offset amount according to the embodiment of FIG. 2.

Referring to FIG. 3, FIG. 3 is a flowchart illustrating a method for updating the offset amount OS according to the embodiment of FIG. 2. The method of the embodiment may be executed by the offset control circuit 230 of FIG. 2. Generally, the mechanism shown in FIG. 3 allows the offset control circuit 230 to decide whether to adjust an offset ratio OFR accordingly. Thereafter, the offset control circuit 230 may take a product of the adjusted/non-adjusted offset ratio OFR and the prefetch amount PN as the updated offset amount OS, and provides the updated offset amount OS to the prefetch address generating circuit 210.

In a different embodiment, when the prefetcher 200 is used as the L1 prefetcher 140a, the default offset ratio OFR may be set to 0. When the prefetcher 200 is used as the L2 prefetcher 150a, the default offset ratio OFR may be set to 1. When the prefetcher 200 is used as the L3 prefetcher 160a, the default offset ratio OFR may be set to 2. In other words, when the implementation of the prefetcher 200 is closer to a Last-Level Cache (LLC), the default offset ratio OFR thereof may be set to a higher value, so that compared with the prefetcher of an upper level cache unit, the prefetcher 200 may prefetch data located farther away, and the prefetching operation may have better timeliness.

Firstly, in the step S31, the offset control circuit 230 determines whether a new access address AC' is received. If not, return to the step S31. If yes, go to the step S32. In the step S32, the offset control circuit 230 further determines whether the stride ST is 0. If the stride ST is 0, return to the step S31. If the stride ST is not 0, go to the step S33.

In the step S33, the offset control circuit 230 further determines whether the stride ST is greater than 0. If the stride ST is greater than 0, the offset control circuit 230 finds out the maximum prefetch address Max_pf from the prefetch address PF_addr and the historical prefetch addresses HPF_1-HPF_(n−1), and determines whether the new access address AC' is greater than the maximum prefetch address Max_pf in a step S34a. If the new access address AC' is greater than the maximum prefetch address Max_pf, the offset control circuit 230 increases a counting value CC in a step S35a, and further determines whether the increased counting value CC is greater than a first threshold Max_counter in a step S36a. If yes, the offset control circuit 230 resets the counting value CC, in a step S37a, such as, set the counting value CC to 0, the offset control circuit 230 also increases the offset ratio OFR, and then returns to the step S31, i.e., the offset control circuit 230 takes a product of the increased offset ratio OFR and the prefetch amount PN as the offset amount OS. If the increased counting value CC is not greater than the first threshold Max_counter, the offset control circuit 230 returns to the step S31 directly, i.e., the offset control circuit 230 maintains the previous offset ratio OFR, and take a product of the previous offset ratio OFR and the prefetch amount PN as the offset amount OS.

However, if the offset control circuit 230 determines that the access address AC' is not greater than the maximum prefetch address Max_pf in the step S34a, the offset control circuit 230 may find out the minimum prefetch address Min_pf from the prefetch address PF_addr and the historical prefetch address HPF_1-HPF_(n−1), and determines whether the access address AC' is smaller than the minimum prefetch address Min_pf in a step S38a. If the access address AC' is smaller than the minimum prefetch address Min_pf, the offset control circuit 230 subtracts a product of the stride ST, the prefetch amount PN and a maximum ratio MaxRatio from the minimum prefetch address Min_pf to generate a reference address RA1, wherein RA1=Min_pf−ST×PN×MaxRatio. And then, the offset control circuit 230 determines whether the access address AC' is smaller than the reference address RA1 in a step S39a. If the access address AC' is smaller than the reference address RA1, the offset control circuit 230 decreases the counting value CC in a step S40a, and determines whether the decreased counting value CC is smaller than a second threshold Min_counter in a step S41a. If the decreased counting value CC is smaller than the second threshold Min_counter, the offset control circuit 230 resets the counting value CC in a step S42a and decreases the offset ratio OFR, and then returns to the step S31, i.e., the offset control circuit 230 takes a product of the decreased offset ratio OFR and the prefetch amount PN as the offset amount OS.

Moreover, in the step S38a, if the access address AC' is not smaller than the minimum prefetch address Min_pf, i.e., the access address AC' is between the maximum prefetch address Max_pf and the minimum prefetch address Min_pf, the offset control circuit 230 may return to the step S31 directly, i.e., the offset control circuit 230 maintains the previous offset ratio OFR, and takes a product of the previous offset ratio OFR and the prefetch amount PN as the offset amount OS. Alternatively, in the step S39a, if the access AC' is not smaller than the reference address RA1, the offset control circuit 230 return to the step S31 directly, i.e., the offset control circuit 230 maintains the previous offset ratio OFR, and takes the product of the previous offset ratio OFR and the prefetch amount PN as the offset amount OS. Moreover, in the step S41a, if the decreased counting value CC is not smaller than the second threshold Min_counter, the offset control circuit 230 may return to the step S31 directly, i.e., the offset control circuit 230 maintains the previous offset ratio OFR, and takes the product of the previous offset ratio OFR and the prefetch amount PN as the offset amount OS.

On the other hand, if the stride ST is determined to be not greater than 0 in the step S33, the offset control circuit 230 may find out the minimum prefetch address Min_pf from the prefetch address PF_addr and the historical prefetch address HPF_1-HPF_(n−1), and determines whether the access address AC' is smaller than the minimum prefetch address Min_pf in a step S34b. If the access address AC' is smaller than the minimum prefetch address Min_pf, the offset control circuit 230 increases the counting value CC in a step S35b, and determines whether the increased counting value CC is greater than the first threshold Max_counter in a step S36b. If yes, the offset control circuit 230 resets the counting value CC in a step S37b, for example, sets the counting value CC to 0, the offset control circuit 230 also increases the offset ratio value OFR, and then returns to the step S31, i.e., the offset control circuit 230 takes the product of the increased offset ratio OFR and the prefetch amount PN as the offset amount OS. If not, the offset control circuit 230 returns to the step S31 directly, i.e., the offset control circuit 230 maintains the previous offset ratio OFR, and takes a product of the previous offset ratio OFR and the prefetch amount PN as the offset amount OS.

However, if the offset control circuit 230 determines that the access address AC' is not smaller than the minimum prefetch address Min_pf in the step S34b, the offset control circuit 230 may find out the maximum prefetch address Max_pf from the prefetch address PF_addr and the historical prefetch address HPF_1-HPF_(n−1), and determines whether the access address AC' is greater than the maximum prefetch address Max_pf in a step S38b. If yes, the offset control circuit 230 subtracts a product of the stride ST, the prefetch amount PN and the maximum ratio MaxRatio from the maximum prefetch address Max_pf to generate a reference address RA2, wherein RA2=Max_pf−ST×PN×MaxRatio. The offset control circuit 230 determines whether the access address AC' is greater than the reference address RA2 in a step S39b. If the access address AC' is greater than the reference address RA2, the offset control circuit 230 decreases the counting value CC in a step S40b, and determines whether the decreased counting value CC is smaller than the second threshold Min_counter in a step S41b. If the decreases counting value CC is smaller than the second threshold Min_counter, the offset control circuit 230 resets the counting value CC in a step S42b and decreases the offset ratio OFR, and then returns to the step S31, i.e., the offset control circuit 230 takes a product of the decreased offset ratio OFR and the prefetch amount PN as the offset amount OS.

Moreover, in the step S38b, if the access address AC' is not greater than the maximum prefetch address Max_pf, i.e., the access address AC' is between the maximum prefetch address Max_pf and the minimum prefetch address Min_pf, the offset control circuit 230 may return to the step S31 directly, i.e., the offset control circuit 230 maintains the previous offset ratio OFR, and takes the product of the previous offset ratio OFR and the prefetch amount PN as the offset amount OS. Alternatively, in the step S39b, if the access address AC' is not greater than the reference address RA2, the offset control circuit 230 may return to the step S31 directly, i.e., the offset control circuit 230 maintains the previous offset ratio OFR, and takes the product of the previous offset ratio OFR and the prefetch amount PN as the offset amount OS. Moreover, in the step S41b, if the decreased counting value CC is not smaller than the second threshold Min_counter, the offset control circuit 230 may return to the step S31 directly, i.e., the offset control circuit 230 maintains the previous offset ratio OFR, and takes the product of the previous offset ratio OFR and the prefetch amount PN as the offset amount OS.

In brief, in the mechanism of FIG. 3, when the stride ST is greater than 0, the offset control circuit 230 may increase/decrease the counting value CC when determining that the access address AC' is greater than the maximum prefetch address Max_pf/smaller than the reference address RA1. When the counting value CC is increased to a certain value, for example, increased to the first threshold Max_counter, it represents that the current data prefetching strategy is relatively conservative, and the recent access addresses AC' are mostly larger than the upper limit of the coverage of prefetched data of the prefetcher 200. Therefore, the offset control circuit 230 may increase the offset ratio OFR to prefetch data located farther away in the subsequent data prefetching operation, so as to achieve a positive data prefetching strategy. Conversely, when the counting value CC is decreased to a certain value, for example, decreased to the second threshold Min_counter, it represents that the current data prefetching strategy is too positive, and the recent access addresses AC' are mostly smaller than the lower limit of the coverage of prefetched data of the prefetcher 200. Therefore, the offset control circuit 230 may decrease the offset ratio OFR to prefetch data closer located in the subsequent data prefetching operation, so as to achieve a conservative data prefetching strategy.

On the other hand, when the stride ST is smaller than 0, the offset control circuit 230 may increase/decrease the counting value CC when determining that the access address AC' is smaller than the minimum prefetch address Min_pf/greater than the reference address RA2, and the corresponding mechanism of adjusting the offset ratio OFR is similar to the aforementioned mechanism of adjusting the offset ratio OFR when the stride ST is greater than 0, which is not repeated.

Referring to FIG. 2 again, according to the above instructions, it is learned that the offset amount OS provided to the multiplying unit 210a of the prefetch address generating circuit 210 by the shift control circuit 230 may be represented as a product of the offset ratio OFR and the prefetch amount PN, i.e., OS=OFR×PN. Correspondingly, the first prefetch base address PBA1 may be represented as PBA1=BA+ST×OFR×PN, and the first prefetch address AD1 may be represented as AD1=ST+PBA1.

For simplicity's sake, the following description is based on the fact that the first prefetch base address PBA1 does not encounter the cross-page situation, so that the multiplexer 210g takes the first prefetch address AD1 as the prefetch address PF_addr, i.e., PF_addr=AD1=ST+PBA1=ST+BA+ST×OFR×PN. Moreover, the prefetcher 200 may further produce (PN−1) additional prefetch addresses according to the prefetch address PF_addr and the stride ST, and prefetch a plurality of data according to the prefetch address PF_addr and the (PN−1) additional prefetch addresses, wherein PN is the prefetch amount PN. In an embodiment, an $1^{th}$ additional prefetch address of the (PN−1) additional prefetch addresses is the prefetch address PF_addr plus 1 times of the stride ST, wherein 1 is a positive integer between 1 and (PN−1).

Figure 4:
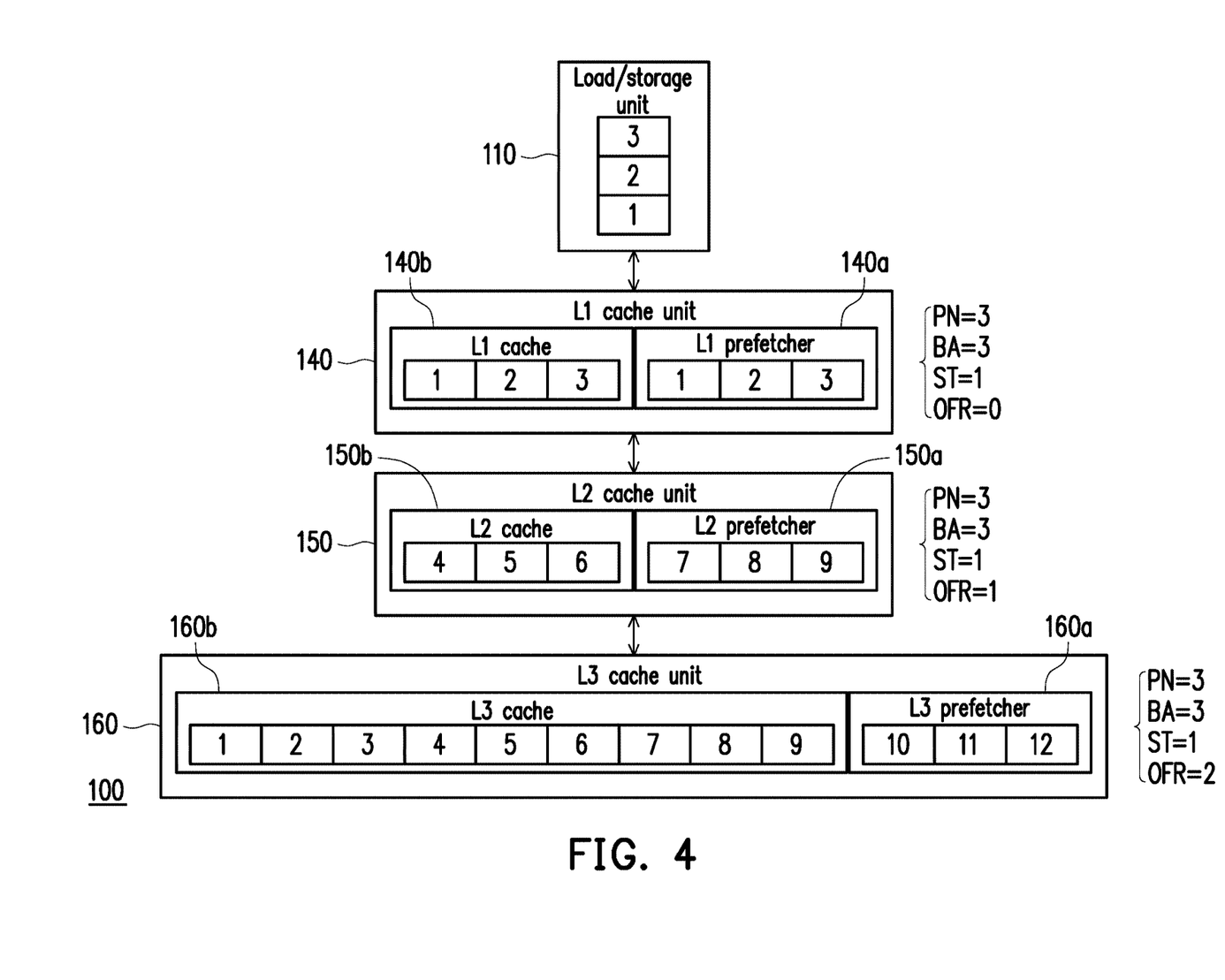
FIG. 4 is a schematic diagram of a multi-level cache structure illustrated according to FIG. 1 to FIG. 3.

Referring to FIG. 4, FIG. 4 is a schematic diagram of a multi-level cache structure illustrated according to FIG. 1 to FIG. 3. According to an embodiment of the disclosure, structures of the L1 prefetcher 140a, the L2 prefetcher 150a and the L3 prefetcher 160a in the processor 100 are all the structures of the prefetcher 200 shown in FIG. 2. For simplicity's sake, it is taken as an example that the default offset ratios OFR of the L1 prefetcher 140a, the L2 prefetcher 150a and the L3 prefetcher 160a are respectively 0, 1 and 2; and the prefetch amount PN, the stride ST and the base address BA provided to the L1 prefetcher 140a, the L2 prefetcher 150a and the L3 prefetcher 160a by the evaluation circuit 130 are respectively 3, 1 and 3, but the disclosure is not limited thereto.

In this case, regarding the L1 prefetcher 140a, since the base address BA is 3, the stride ST is 1, the offset ratio OFR is 0 and the prefetch amount PN is 3, the obtained prefetch address PF_addr is 4, i.e., PF_addr=ST+BA+ST×OFR×PN=1+3+1×0×3=4, which is simply referred to as an address 4. Moreover, the L1 prefetcher 140a may further generate 2 additional prefetch addresses, and the 2 additional prefetch addresses are respectively the address 4 plus 1 times of the stride ST, and the address 4 plus 2 times of the stride ST, i.e., an address 5 and an address 6. Correspondingly, the L1 prefetcher 140a may prefetch a plurality of cache lines corresponding to the addresses 4, 5 and 6. Thereafter, the L1 prefetcher 140a may further execute the method shown in FIG. 3 according to the access address AC1 coming from the load/storage unit 110, so as to update the offset ratio OFR of the L1 prefetcher 140a. In this way, the accuracy, timeliness and coverage of the data prefetching operation of the L1 prefetcher 140a may be improved.

Regarding the L2 prefetcher 150a, since the base address BA is 3, the stride ST is 1, the offset ratio OFR is 1 and the prefetch amount PN is 3, the obtained prefetch address PF_addr is an address 7, i.e., PF_addr=ST+BA+ST×OFR×PN=1+3+1×1×3=7. Moreover, the L2 prefetcher 150a may further generate 2 additional prefetch addresses, and the 2 additional prefetch addresses are respectively the address 7 plus 1 times of the stride ST, and the address 7 plus 2 times of the stride ST, i.e., an address 8 and an address 9. Correspondingly, the L2 prefetcher 150a may prefetch a plurality of cache lines corresponding to the addresses 7, 8 and 9. Thereafter, the L2 prefetcher 150a may further execute the method shown in FIG. 3 according to the access address AC2 coming from the L1 cache unit, so as to update the offset ratio OFR of the L2 prefetcher 150a. In this way, the accuracy, timeliness and coverage of the data prefetching operation of the L2 prefetcher 150a may be improved.

Regarding the L3 prefetcher 160a, since the base address BA is 3, the stride ST is 1, the offset ratio OFR is 2 and the prefetch amount PN is 3, the obtained prefetch address PF_addr is an address 10, i.e., PF_addr=ST+BA+ST×OFR×

PN=1+3+1×2×3=10. Moreover, the L3 prefetcher 160a may further generate 2 additional prefetch addresses, and the 2 additional prefetch addresses are respectively the address 10 plus 1 time of the stride ST, and the address 10 plus 2 times of the stride ST, i.e., an address 11 and an address 12. Correspondingly, the L3 prefetcher 160a may prefetch a plurality of cache lines corresponding to the addresses 10, 11 and 12. Thereafter, the L3 prefetcher 160a may further execute the method shown in FIG. 3 according to the access address AC3 coming from the L2 cache unit, so as to update the offset ratio OFR of the L3 prefetcher 160a. In this way, the accuracy, timeliness and coverage of the data prefetching operation of the L3 prefetcher 160a may be improved.

Moreover, according to FIG. 4, it is known that the addresses respectively generated by the L1 prefetcher 140a, the L2 prefetcher 150a and the L3 prefetcher 160a are included in the set of addresses generated by the corresponding next level prefetcher. Therefore, the load/storage unit 110 may probably only be affected by latency between itself and the L1 cache unit 140; the L1 cache unit 140 may probably only be affected by latency between itself and the L2 cache unit 150; the L2 cache unit 150 may probably only be affected by latency between itself and the L3 cache unit 160; and the L3 cache unit 160 may probably only be affected by latency between itself and the memory 170.

Figure 5:
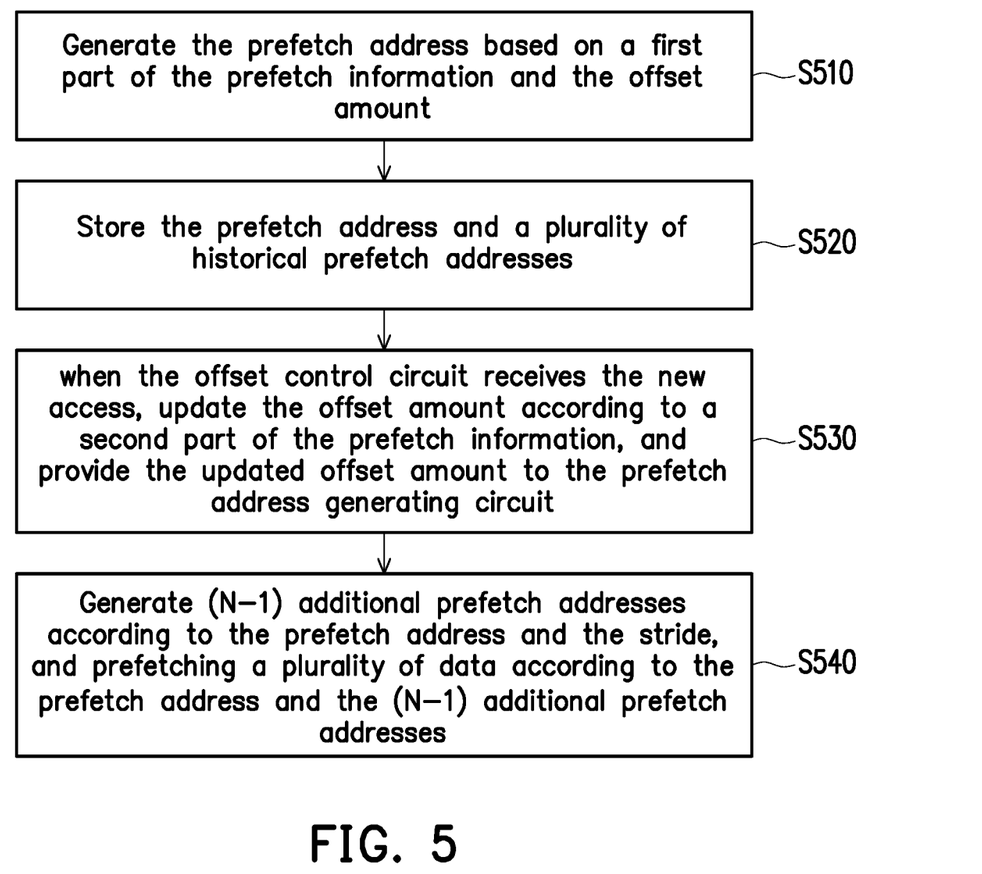
FIG. 5 is a flowchart illustrating an operating method of a prefetcher according to an embodiment of the disclosure.

Referring to FIG. 5, FIG. 5 is a flowchart illustrating an operating method of a prefetcher according to an embodiment of the disclosure. The method of the embodiment may be executed by the prefetcher 200 of FIG. 2, and detail thereof is described below with reference of the components of FIG. 2.

In a step S510, the prefetch address generating circuit 210 generates the prefetch address PF_addr based on the first prefetch information and the offset amount OS, wherein the first prefetch information comprises the stride ST, the base address BA and the next page base address NBA (if any). In a step S520, the address tracking circuit 220 stores the prefetch address PF_addr and a plurality of historical prefetch addresses HPF_1-HPF_(n−1). In a step S530, when the offset control circuit 230 receives the access address AC', the offset control circuit 230 updates the offset amount OS according to second prefetch information, the access address AC', the prefetch address PF_addr and the historical prefetch addresses HPF_1-HPF_(n−1), and provides the updated offset amount OS to the prefetch address generating circuit 210, wherein the second prefetch information comprises the prefetch amount PN, the base address BA and the stride ST. Details of each of the above steps may refer to related descriptions of the embodiments of FIG. 1 to FIG. 4, which are not repeated.

In summary, the processor, the prefetcher and the operating method of the prefetch of the disclosure may use the evaluation circuit to find out the most suitable stride for data prefetching based on the access addresses provided by the load/storage unit, so as to generate the base address and the prefetch amount. Thereafter, the evaluation circuit provides the stride, the base address and the prefetch amount to the prefetchers of each level of the cache units, so as to improve the accuracy, timeliness and coverage of the data prefetching operation of each of the prefetchers. Moreover, the offset control circuit in each of the prefetchers may adaptively adjust the offset ratio, so that the prefetch address generated by the prefetch address generating circuit may be more accurate. Moreover, each level of the cache units is only affected by the latency between itself and the corresponding next level cache unit, so as to further improve the timeliness.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. A prefetcher, comprising:
   a prefetch address generating circuit, generating a prefetch address based on a reference product which is calculated by multiplying a first stride and an offset amount, wherein the first stride is a parameter of first prefetch information;
   an address tracking circuit, coupled to the prefetch address generating circuit, and storing the prefetch address and a plurality of historical prefetch addresses; and
   an offset control circuit, coupled to the prefetch address generating circuit and the address tracking circuit, wherein when the offset control circuit receives an access address, the offset control circuit updates the offset amount according to second prefetch information, the access address, the prefetch address, and the historical prefetch addresses, and provides an updated offset amount to the prefetch address generating circuit,
   wherein the prefetch address generating circuit comprises:
   a multiplying circuit, receiving the first stride and the offset amount, and multiplying the first stride and the offset amount to generate the reference product;
   a first adder, coupled to the multiplying circuit, receiving the reference product and a first base address, and adding the reference product and the first base address to generate a first prefetch base address; and
   a second adder, coupled to the first adder, receiving the first stride and the first prefetch base address, and adding the first stride and the first prefetch base address to generate a first prefetch address.

2. The prefetcher as claimed in claim 1, wherein the address tracking circuit comprises a queue, and the address tracking circuit pushes the prefetch address into the queue after receiving the prefetch address, and removes an oldest historical prefetch address from the queue when the queue is fully filled.

3. The prefetcher as claimed in claim 1, wherein the access address corresponds to a cache miss occurring in an upper level cache unit of the prefetcher.

4. The prefetcher as claimed in claim 3, wherein the prefetcher is set in a first level cache unit of a processor, and the upper level cache unit is a load/storage unit of the processor.

5. The prefetcher as claimed in claim 3, wherein the prefetcher is set in a second level cache unit of a processor, and the upper level cache unit is a first level cache unit of the processor.

6. The prefetcher as claimed in claim 3, wherein the prefetcher is set in a third level cache unit of a processor, and the upper level cache unit is a second level cache unit of the processor.

7. The prefetcher as claimed in claim 1, wherein the second prefetch information comprises a prefetch amount, a first base address, and a second stride, and the offset control circuit updates the offset amount according to the prefetch amount, the first base address, the second stride, the access address, the prefetch address, and the historical prefetch addresses.

8. The prefetcher as claimed in claim 7, wherein the offset control circuit is configured to:
  determine a maximum prefetch address from the prefetch address and the historical prefetch addresses when the second stride is greater than 0;
  increase a counting value when the access address is greater than the maximum prefetch address;
  reset the counting value and increase an offset ratio when the counting value is greater than a first threshold; and
  take a product of the increased offset ratio and the prefetch amount as the updated offset amount.

9. The prefetcher as claimed in claim 8, wherein when the counting value is not greater than the first threshold, the offset ratio is kept, and the product of the offset ratio and the prefetch amount is taken as the updated offset amount.

10. The prefetcher as claimed in claim 8, wherein the offset control circuit is configured to:
  determine a minimum prefetch address from the prefetch address and the historical prefetch addresses when the access address is not greater than the maximum prefetch address;
  subtract a product of the second stride, the prefetch amount, and a maximum ratio from the minimum prefetch address to generate a reference address when the access address is smaller than the minimum prefetch address;
  decrease a counting value when the access address is smaller than the reference address;
  reset the counting value and decrease an offset ratio, when the counting value is smaller than a second threshold; and
  take the product of the decreased offset ratio and the prefetch amount as the updated offset amount.

11. The prefetcher as claimed in claim 10, wherein when the access address is between the maximum prefetch address and the minimum prefetch address, when the access address is not smaller than the reference address, or when the counting value is not smaller than the second threshold, the offset ratio is kept, and the product of the offset ratio and the prefetch amount is taken as the updated offset amount.

12. The prefetcher as claimed in claim 7, wherein the offset control circuit is configured to:
  determine a minimum prefetch address from the prefetch address and the historical prefetch addresses when the second stride is smaller than 0;
  increase a counting value when the access address is smaller than the minimum prefetch address;
  reset the counting value and increase an offset ratio when the counting value is greater than a first threshold; and
  take the product of the increased offset ratio and the prefetch amount as the updated offset amount.

13. The prefetcher as claimed in claim 12, wherein when the counting value is not greater than the first threshold, the offset ratio is kept, and the product of the offset ratio and the prefetch amount is taken as the updated offset amount.

14. The prefetcher as claimed in claim 12, wherein the offset control circuit is configured to:
  determine a maximum prefetch address from the prefetch address and the historical prefetch addresses when the access address is not smaller than the minimum prefetch address;
  subtract a product of the second stride, the prefetch amount, and a maximum ratio from the maximum prefetch address to generate a reference address when the access address is greater than the maximum prefetch address;
  decrease a counting value when the access address is greater than the reference address;
  reset the counting value and decrease an offset ratio when the counting value is smaller than a second threshold; and
  take the product of the decreased offset ratio and the prefetch amount as the updated offset amount.

15. The prefetcher as claimed in claim 14, wherein when the access address is between the maximum prefetch address and the minimum prefetch address, or when the access address is not greater than the reference address, or when the counting value is not smaller than the second threshold, the offset ratio is kept, and the product of the offset ratio and the prefetch amount is taken as the updated offset amount.

16. The prefetcher as claimed in claim 1, wherein the first prefetch information comprises the first base address, a second base address, and the first stride.

17. The prefetcher as claimed in claim 16, wherein the prefetch address generating circuit further comprises:
  a third adder, receiving the second base address and the stride, and adding the second base address and the first stride to generate a second prefetch base address;
  a fourth adder, coupled to the third adder, receiving the first stride and the second prefetch base address, and adding the first stride and the second prefetch base address to generate a second prefetch address;
  a cross-page detecting circuit, coupled to the second adder, receiving the first prefetch address, determining whether the first prefetch address encounters a cross-page situation, and correspondingly generating a control signal;
  a multiplexer, coupled to the second adder and the fourth adder, and receiving the first prefetch address and the second prefetch address, wherein the multiplexer takes the first prefetch address or the second prefetch address as the prefetch address to output to the address tracking circuit in response to the control signal.

18. The prefetcher as claimed in claim 17, wherein when the control signal indicates that the first prefetch address does not encounter the cross-page situation, the multiplexer takes the first prefetch address as the prefetch address to output to the address tracking circuit, and when the control signal indicates that the first prefetch address encounters the cross-page situation, the multiplexer takes the second prefetch address as the prefetch address to output to the address tracking circuit.

19. The prefetcher as claimed in claim 1, wherein the second prefetch information at least comprises a prefetch amount and a second stride, and the prefetcher further generates (PN−1) additional prefetch addresses according to the prefetch address and the second stride and prefetches a plurality of data according to the prefetch address and the (PN−1) additional prefetch addresses, wherein PN is the prefetch amount.

20. The prefetcher as claimed in claim 19, wherein an ith additional prefetch address of the (PN−1) additional prefetch addresses is the prefetch address plus i times of the second stride, wherein i is a positive integer between 1 and (PN−1).

21. A processor, comprising:
  a load/storage unit, generating a first access address;
  an access filter, receiving the first access address and filtering a repeated first access address;
  an evaluation circuit, scoring a plurality of stride candidates based on the filtered first access address, selecting a stride from the stride candidates, and determining a first base address and a prefetch amount according to a score of the stride;

at least one cache unit, coupled to the evaluation circuit, wherein each of the cache unit comprises a prefetcher, and the prefetcher of each of the at least one cache unit comprises:
- a prefetch address generating circuit, coupled to the evaluation circuit, and generating a prefetch address based on first prefetch information and an offset amount;
- an address tracking circuit, coupled to the evaluation circuit and the prefetch address generating circuit, and storing the prefetch address and a plurality of historical prefetch addresses; and
- an offset control circuit, coupled to the prefetch address generating circuit and the address tracking circuit, wherein when the offset control circuit receives a second access address, the offset control circuit updates the offset amount according to second prefetch information, the second access address, the prefetch address, and the historical prefetch addresses, and provides the updated offset amount to the prefetch address generating circuit, wherein the second prefetch information comprises the stride, the first base address, and the prefetch amount.

22. The processor as claimed in claim 21, wherein the evaluation circuit is configured to:
- when receiving a pth first access address, generate a plurality of prefetch address candidates based on the stride candidates and the pth first access address, wherein the prefetch address candidates correspond to the stride candidates in a one-to-one manner;
- when receiving a (p+1)th first access address, determine whether the (p+1)th first access address matches one of the prefetch address candidates;
- if the (p+1)th first access address matches a qth prefetch address candidate of the prefetch address candidates, accumulate a score of a qth stride candidate of the stride candidates;
- select the stride from the stride candidates after evaluating the score of each of the stride candidates based on the first access address, wherein the score of the stride is the highest in the stride candidates; and
- take a specific prefetch address candidate corresponding to the stride as the first base address.

23. The processor as claimed in claim 21, wherein when the score of the stride is in a first section, the evaluation circuit sets the prefetch amount as a first amount, when the score of the stride is in a second section, the evaluation circuit sets the prefetch amount as a second amount, and when the score of the stride is in a third section, the evaluation circuit sets the prefetch amount as a third amount.

24. The processor as claimed in claim 21, wherein the second access address of each of the at least one cache unit corresponds to a cache miss occurring in an upper level cache unit of each of the at least one cache unit.

25. The processor as claimed in claim 24, wherein the at least one cache unit comprises a first level cache, and the upper level cache unit of the first level cache is the load/storage unit.

26. The processor as claimed in claim 25, wherein the at least one cache unit further comprises a second level cache, and the upper level cache unit of the second level cache is the first level cache.

27. The processor as claimed in claim 26, wherein the at least one cache unit further comprises a third level cache, and the upper level cache unit of the third level cache is the second level cache.

28. The processor as claimed in claim 21, wherein the prefetcher further generates (PN−1) additional prefetch addresses according to the prefetch address and the stride, and prefetches a plurality of data according to the prefetch address and the (PN−1) additional prefetch addresses, wherein PN is the prefetch amount.

29. The processor as claimed in claim 28, wherein an ith additional prefetch address of the (PN−1) additional prefetch addresses is the prefetch address plus i times of the stride, wherein i is a positive integer between 1 and (PN−1).

30. An operating method of a prefetcher, comprising:
- generating a prefetch address by a prefetch address generating circuit of the prefetcher based on a reference product which is calculated by multiplying a first stride and an offset amount, wherein the first stride is a parameter of first prefetch information;
- storing the prefetch address and a plurality of historical prefetch addresses by an address tracking circuit of the prefetcher;
- when an offset control circuit of the prefetcher receives a second access address, updating the offset amount by the offset control circuit according to second prefetch information, the second access address, the prefetch address, and the historical prefetch addresses, and providing the updated offset amount to the prefetch address generating circuit, wherein the second prefetch information comprises a second stride and a prefetch amount; and
- generating (PN−1) additional prefetch addresses according to the prefetch address and the second stride, and prefetching a plurality of data according to the prefetch address and the (PN−1) additional prefetch addresses, wherein PN is the prefetch amount, wherein the prefetch address generating circuit comprises:
- a multiplying circuit, receiving the first stride and the offset amount, and multiplying the first stride and the offset amount to generate the reference product;
- a first adder, coupled to the multiplying circuit, receiving the reference product and a first base address, and adding the reference product and the first base address to generate a first prefetch base address; and
- a second adder, coupled to the first adder, receiving the first stride and the first prefetch base address, and adding the first stride and the first prefetch base address to generate a first prefetch address.

* * * * *